Patented Aug. 11, 1936

2,051,005

UNITED STATES PATENT OFFICE 2,051,005

PROCESS OF PRODUCING N-SUBSTITUTION PRODUCTS OF 1,4-DIAMINOANTHRAQUINONES

Karl Koeberle, Robert Schweizer, and Christian Steigerwald, Ludwigshafen-on-the-Rhine, Germany, assignors to General Aniline Works, Inc., New York, N. Y., a corporation of Delaware No Drawing. Application September 10, 1934, Serial No. 743,482. In Germany September 19, 1933

20 Claims. (Cl. 260—60)

The present invention relates to N-substitution products of 1,4-diaminoanthraquinones and a process of producing same.

We have found that N-substitution products of 1,4-diaminoanthraquinones can be obtained by condensing one molecular proportion of a stable reduction product of a 1,4-diaminoanthraquinone with a mixture of less than two molecular proportions of a primary arylamine and an amine corresponding to the formula $R.NH_2$, wherein R stands for an aryl radicle different from that contained in the said primary arylamine or for —OH, —$NH_2$, —NH-aryl or an alkyl, aralkyl, cycloalkyl or heterocyclic radicle. The organic radicles therein may contain further substituents as for example halogen atoms, amino, alkylamino, arylamino, acylamino, nitro, hydroxy, alkoxy, aryloxy, acyl, cyano, mercapto, thiocyano, carboxylic or sulphonic acid or aldehyde groups. The amines may be employed as such or in the form of their salts with mineral acids.

The condensation usually takes place without the addition of a condensing agent and at atmospheric pressure, ammonia being evolved. In many cases, it is of advantage to carry out the condensation in the presence of mineral acids such as halogen hydrides, sulphuric acid or nitric acid. The condensation may be carried out in the presence of an inert diluent as for example water, aliphatic acohols, hydrocarbons, halogenated or nitrated hydrocarbons, ethers, ketones, aliphatic carboxylic acids of low molecular weight, such as formic, acetic or propionic acid, esters or other suitable organic diluents. When working in the presence of air or oxygen, the N-substituted 1,4-diaminoanthraquinones themselves are obtained as reaction products. In other cases the corresponding stable reduction products are obtained which are converted, preferably without isolation, into the corresponding 1,4-diaminoanthraquinones in one operation by oxidation, as for example by leading in air or oxygen or by treatment with iron chloride or other suitable oxidizing agents, preferably in the presence of copper, copper salts or salts of vanadic acid. The oxidation may also be carried out with advantage in the presence of little amounts of a secondary or tertiary amine. Piperidine is especially suitable for this purpose.

Besides the stable reduction product of 1,4-diaminoanthraquinone itself, the stable reduction products of 1,4-diaminoanthraquinones which are substituted in the 5- and/or 8-positions by hydroxy, alkoxy, amino or alkylamino groups or of 1,4-diaminoanthraquinones which are substituted in at least one of the positions 2 and 3 by halogen atoms or hydroxy, alkoxy, phenoxy, alkyl, carboxylic acid carbonamide or cyano groups may be employed as initial materials. The stable reduction products of 1,4-di-monoalkylaminoanthraquinones may also be employed for producing 1,4-diaminoanthraquinones containing in one of the amino groups an aryl group and in the other amino group an alkyl group, by condensing the said 1,4-di-monoalkylaminoanthraquinones with less than two molecular proportions of a primary arylamine. In this case instead of ammonia the corresponding alkylamine is split off. The said stable reduction products will hereinafter briefly be named "leuco" compounds.

Primary arylamines suitable for the condensation are for example aniline, anisidine, the toluidines, the xylidines, the aniline carboxylic acids or their esters and nitriles, the aniline sulphonic acids, the toluidine sulphonic acids, the halogenanilines, the halogentoluidines, the primary aromatic nitroamines, the aminonaphthalenes, the phenylene diamines, aminodiphenyl, aminodiphenylamine, the monoacetylphenylene diamines, aminopyrenes, aminochrysenes, aminofluorenes, aminofluorenones and their derivatives. As amines corresponding to the formula $R.NH_2$ as defined above may be mentioned for example hydroxylamine, hydrazine, phenylhydrazine, naphthylhydrazine, nitrophenylhydrazine, semicarbazide, the primary alkylamines, such as methylamine, ethylamine, ethylene diamine, propylamine, normal butylamine, isobutylamine, dodecylamine, ethanolamine $$(HO-CH_2-CH_2-NH_2),$$

butanolamine $$(HO-CH_2-CH_2-CH_2-CH_2-NH_2),$$

the primary halogenalkylamines, aralkylamines, as for example benzylamine and beta-phenylethylamine ($C_6H_5-CH_2-CH_2-NH_2$), amino-1-methylnaphthalene and cycloalkylamines, as for example cyclohexylamine, aminotetrahydronaphthalene and their substitution products, heterocyclic amines, as for example aminopyridines, aminoquinolines, aminonaphthoquinolines, aminocarbazoles, aminodiphenyleneoxides, aminoacridines, aminoacridones and their derivatives.

The reaction products are usually obtained in very good yields, excellent purity and in crystalline form. They may be employed in part as dyestuffs for dyeing acetyl cellulose or for coloring artificial compositions of various kinds, benzine or petroleum, lacquers, oils, waxes and paraffin waxes, and in part as intermediate products for the preparation of dyestuffs. If the products contain sulphonic acid groups which may be present in the initial materials or may be introduced by a subsequent treatment with sulphonating agents, they are suitable for dyeing animal fibres and, in some cases, for dyeing vegetable fibres.

The following examples will further illustrate how the said invention may be carried out in practice but the invention is not restricted to these examples. The parts are by weight.

*Example 1*

A suspension of 24.5 parts of leuco-1,4-diaminoanthraquinone, 11.8 parts of para-toluidine and 13.5 parts of para-anisidine in 150 parts of trichlorbenzene is boiled in the presence of air, until ammonia no longer escapes. After cooling, the mass is diluted with ether. The thus formed crystalline powder is filtered off by suction. It dissolves in organic solvents giving a blue-green coloration and in concentrated sulphuric acid giving a blue coloration. It is 1-para-toluidino-4-para-anisidinoanthraquinone. After sulphonating it dyes animal fibres green shades.

*Example 2*

24.5 parts of leuco-1,4-diaminoanthraquinone and 13.5 parts of para-anisidine are suspended in a solution of 11.9 parts of phenylhydrazine in 150 parts of trichlorbenzene. The suspension is boiled, while stirring, in the presence of air, until ammonia no longer escapes. After cooling, the reaction product is filtered off by suction, washed with ether and dried. A blue powder is obtained which is 1-para-anisidino-4-phenylhydrazinoanthraquinone. It dissolves in concentrated sulphuric acid giving a blue coloration and in trichlorbenzene giving a blue coloration which by heating turns violet. It dyes acetyl cellulose deep blue shades.

*Example 3*

24.5 parts of leuco-1,4-diaminoanthraquinone, 14.2 parts of aniline hydrochloride and 17.5 parts of para-anisidine hydrochloride are suspended in 200 parts of methanol. The suspension is boiled in the presence of air, while stirring, until initial material is no longer detectable. After cooling, the reaction product is filtered off by suction, washed with methanol and dried. 1-anilido-4-para-anisidinoanthraquinone is obtained in an almost quantitative yield. It dissolves in concentrated sulphuric acid giving a blue-green coloration. By pouring the solution into water a green precipitate is obtained. It dissolves in warm nitrobenzene or trichlorbenzene giving a blue-green coloration. By treating with oleum at room-temperature a blue sulphonation product is obtained which dyes wool blue-green shades from acid baths. By warming the solution in oleum the blue coloration turns red.

*Example 4*

A suspension of 24.5 parts of leuco-1,4-diaminoanthraquinone, 18.7 parts of 2-aminonaphthalene hydrochloride and 14.2 parts of aniline hydrochloride in 250 parts of methanol is boiled while stirring, until initial material is no longer detectable. After cooling, the reaction product (1-naphthyl-2)-amino-4-anilidoanthraquinone) is filtered off by suction and washed with methanol and water. It is a green crystalline powder which dissolves in concentrated sulphuric acid and in trichlorbenzene giving a green coloration. By treating with sulphonating agents the dyestuff is converted into a sulphonic acid which dyes wool bluish-green shades from acid baths.

*Example 5*

A suspension of 24.5 parts of leuco-1,4-diaminoanthraquinone, 14.2 parts of aniline hydrochloride and 7.7 parts of hydroxylamine hydrochloride in 245 parts of methanol is boiled, while stirring, until initial material is no longer detectable. After cooling, reaction mass is filtered off by suction and the filtrate diluted with water. Yellowish-brown needles separate dissolving in sodium hydroxide solution giving an orange coloration. The needles are isolated in the usual manner and dried. By suspending them in an alcoholic sodium hydroxide solution and leading in air oxidation takes place. The thus formed dyestuff dyes acetyl cellulose blue-violet shades.

Instead of aniline hydrochloride other mineral acid salts of aniline or salts of other aromatic amines as for example those of toluidines, anisidines, xylidines, aminodiphenylamines, aminonaphthalenes or aminobenzophenones may be employed.

*Example 6*

A mixture of 24.5 parts of leuco-1,4-diaminoanthraquinone, 14.5 parts of para-anisidine, 11.8 parts of benzylamine, 245 parts of methanol and 23.5 parts of 34.5 per cent aqueous hydrochloric acid is boiled, while stirring, until initial material is no longer detectable. After cooling, the reaction product is filtered off by suction and washed with methanol and water. The greenish product dissolves in nitrobenzene giving a brown coloration which by heating and adding a little piperidine turns blue. The oxidation may also be carried out in alcoholic sodium hydroxide solution in the presence of air. The thus formed 1-para-anisidino-4-benzylaminoanthraquinone dyes acetyl cellulose blue shades.

Similar reaction products are obtained by employing ortho- or meta-anisidine, aniline, toluidines, xylidines or halogen anilines instead of para-anisidine and by employing beta-phenylethylamine or -amino-1-methyl naphthalene instead of benzylamine.

*Example 7*

A mixture of 24.5 parts of leuco-1,4-diaminoanthraquinone, 11.8 parts of para-toluidine, 10.8 parts of cyclohexylamine, 245 parts of methanol and 23.5 parts of 34.5 per cent aqueous hydrochloric acid is boiled, while stirring, until initial material is no longer detectable. After working up, a blue green powder is obtained which dissolves in concentrated sulphuric acid giving a green coloration and in cold nitrobenzene giving a brown coloration which by heating turns green-blue. By suspending the leuco compound in alcohol and oxidizing in the presence of sodium hydroxide by leading air through the boiling solution, 1-para-toluidino-4-cyclohexylaminoanthraquinone is obtained in the form of a blue powder.

Instead of para-toluidine other aromatic amines as for example ortho- or meta-toluidine, aniline, xylidines, anisidines or aminonaphthalenes may be employed.

*Example 8*

A suspension of 13.4 parts of leuco-1,4-dimonomethylaminoanthraquinone and 6.5 parts of aniline hydrochloride in 150 parts of methanol is boiled, while stirring, until initial material is no longer detectable. After working up, 1-methylamino-4-anilidoanthraquinone is obtained in the form of a blue powder. It dissolves in concentrated sulphuric acid, nitrobenzene or trichlorbenzene giving a blue-green coloration. It dyes acetyl cellulose greenish-blue shades.

Similar dyestuffs are obtained by employing the hydrochlorides of the toluidines or of the anisidines instead of that of aniline.

*Example 9*

A suspension of 24.5 parts of leuco-1,4-diaminoanthraquinone, 13 parts of aniline hydrochloride and 6.8 parts of methylamine hydrochloride is reacted in the manner described in Example 8. Leuco-1-methylamino-4-anilidoanthraquinone is obtained in the form of green crystals which by suspending them in alcoholic sodium hydroxide solution and leading in air are oxidized to the blue dyestuff which dyes acetyl cellulose blue shades.

*Example 10*

A mixture of 24.5 parts of leuco-1,4-diaminoanthraquinone, 14.5 parts of para-anisidine, 8 parts of butylamine, 245 parts of methanol and 23.5 parts of 34.5 per cent aqueous hydrochloric acid is boiled, while stirring, until initial material is no longer detectable. After working up, leuco-1-para-anisidino-4-butylaminoanthraquinone is obtained in the form of green crystals. It dissolves in nitrobenzene giving a brown coloration which by adding a little piperidine and heating the solution turns greenish-blue.

The oxidation may also be effected by suspending the leuco compound in a mixture of methanol and a little aqueous sodium hydroxide solution and leading air through the boiling liquid. The blue dyestuff dissolves in concentrated sulphuric acid giving a blue coloration. It dyes acetyl cellulose powerful blue shades.

*Example 11*

A mixture of 16.4 parts of 1,4-di-monohydroxyethylamino-anthraquinone, 7.2 parts of para-toluidine hydrochloride and 120 parts of methanol is boiled, while stirring, until the initial material can no longer be detected. The green crystals of the leuco-1-hydroxyethylamino-4-para-toluidinoanthraquinone are then filtered off by suction, washed with water and dried. By oxidizing the solution of the leuco compound in nitrobenzene in the presence of a little piperidine or in methanol in the presence of sodium hydroxide, the dyestuff is obtained in the form of blue-green crystals which dye acetyl cellulose greenish-blue shades.

Similar dyestuffs are obtained if instead of para-toluidine hydrochloride the hydrochlorides of the other toluidines or of the xylidines, anisidines, amino-naphthalenes or of aniline or their substitution products or of other primary aromatic amines are employed.

*Example 12*

A suspension of 26.8 parts of leuco-1,4-di-monomethylaminoanthraquinone and 18.2 parts of 2-aminonaphthalene hydrochloride in 250 parts of methanol is boiled, while stirring, in the presence of air until initial material is no longer detectable. After cooling, the reaction product is filtered off by suction, washed with methanol and water and dried. 1-methylamino-4-(naphthyl-2)-aminoanthraquinone is obtained in the form of a blue powder which dissolves in nitrobenzene or trichlorbenzene giving a blue-green coloration. It dyes acetyl cellulose blue-green shades.

Similar dyestuffs are obtained if leuco-1,4-di-monoethylaminoanthraquinone or leuco-1,4-di-monobutylaminoanthraquinone are employed as initial materials. Instead of 2-aminonaphthalene hydrochloride 1-aminonaphthalene hydrochloride or the hydrochlorides of substituted amino-naphthalenes may be employed.

*Example 13*

A suspension of 35.2 parts of leuco-1,4-di-monobutylaminoanthraquinone and 14.4 parts of para-toluidine hydrochloride in 200 parts of methanol is boiled, while stirring, until initial material is no longer detectable. After cooling and working up, leuco-1-butylamino-4-para-toluidino-anthraquinone is obtained in the form of brown crystals. It can be readily oxidized by heating its solution in nitrobenzene or in a solution of sodium hydroxide in methanol. The dyestuff is readily soluble in petroleum hydrocarbons and in nitrobenzene giving a greenish-blue coloration. It dyes acetyl cellulose blue shades.

Instead of para-toluidine hydrochloride the hydrochlorides of the other toluidines, of anisidines, xylidines or of aniline or their substitution products may be employed.

*Example 14*

A suspension of 16.4 parts of leuco-1,4-dihydroxyethyl aminoanthraquinone and 5.5 parts of para-phenylenediamine in 70 parts of trichlorbenzene is heated in the presence of air at 180° C., until initial material is no longer detectable. After cooling, the reaction product is filtered off by suction, washed with ethanol and ether and dried. It is a blue powder which dissolves in nitrobenzene or trichlorbenzene giving a blue-green coloration. It dyes acetyl cellulose greenish-blue shades.

*Example 15*

A suspension of 24.5 parts of 1,4-diaminoanthraquinone, 24.3 parts of aminochrysene and 21.7 parts of aminopyrene in 150 parts of trichlorbenzene is boiled, while stirring, until ammonia no longer escapes. After cooling, the reaction product is filtered off by suction, washed with ethanol and ether and dried. The thus formed 1-(chrysyl)-amino-4-(pyryl)-aminoanthraquinone is a blue powder which dissolves in concentrated sulphuric acid giving a blue coloration and in nitrobenzene giving a green coloration. By treating with sulphonating agents, a sulphonated product is obtained which dyes animal fibres green shades.

What we claim is:

1. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula R.NH$_2$, wherein R stands for a member of the group consisting of —OH, —NH$_2$, —NH-aryl, aralkyl, cycloalkyl, heterocyclic and aliphatic hydrocarbon radicals and aryl radicals different from that contained in the said primary aryl amine.

2. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of an acid condensing agent.

3. A process of producing N-substitution products of 1,4-diaminoanthraquinones which comprises condensing a leuco compound of a 1,4-diaminoanthraquinone with 2 to 2.5 molecular proportions of a mixture containing besides less than two molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of a mineral acid.

4. A process of producing N-substitution products of 1,4-diaminoanthraquinones which comprises condensing a leuco compound of a 1,4-diaminoanthraquinone with the mineral acid salts of 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine.

5. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of an oxidizing agent.

6. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of oxygen.

7. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of a copper-containing substance.

8. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of a copper salt and of an organic base selected from the class consisting of secondary and tertiary amines.

9. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of piperidine.

10. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of an inert diluent.

11. A process of producing N-substitution products of 1,4-diaminoanthraquinones which comprises condensing a leuco compound of a 1,4-diaminoanthraquinone with 2 to 2.5 molecular proportions of a mixture containing besides less than two molecular proportions of a primary arylamine and an amine corresponding to the formula $R.NH_2$, wherein R stands for a member of the group consisting of —OH, —$NH_2$, —NH-aryl, aralkyl, cycloalkyl, heterocyclic and aliphatic hydrocarbon radicles and aryl radicles different from that contained in the said primary aryl amine in the presence of water.

12. A process of producing N-substitution products of 1,4-diaminoanthraquinones which comprises condensing the leuco compound of a 1,4-diaminoanthraquinone with 2 to 2.5 molecular proportions of a mixture containing besides less than 2 molecular proportions of a primary arylamine an amine corresponding to the formula $R.NH_2$, wherein R stands for a member of the group consisting of —OH, —$NH_2$, —NH-aryl, arlkyl, cycloalkyl, heterocyclic and aliphatic hydrocarbon radicles and aryl radicles different from that contained in the said primary aryl amine in the presence of an aliphatic alcohol of low molecular weight.

13. A process of producing N-substitution products of 1,4-diaminoanthraquinones which comprises condensing the leuco compound of a 1,4-diaminoanthraquinone with 2 to 2.5 molecular proportions of a mixture containing besides less than 2 molecular proportions of a primary arylamine an amine corresponding to the formula R.NH₂, wherein R stands for a member of the group consisting of —OH, —NH₂, —NH-aryl, aralkyl, cycloalkyl, heterocyclic and aliphatic hydrocarbon radicles and aryl radicles different from that contained in the said primary aryl amine in the presence of trichlorbenzene.

14. A process of producing N-substitution products of 1,4-diaminoanthraquinones which comprises condensing the leuco compound of 1,4-diaminoanthraquinone with 2 to 2.5 molecular proportions of a mixture containing besides less than 2 molecular proportions of a primary arylamine an amine corresponding to the formula R.NH₂, wherein R stands for a member of the group consisting of —OH, —NH₂, —NH-aryl, aralkyl, cycloalkyl, heterocyclic and aliphatic hydrocarbon radicles and aryl radicles different from that contained in the said primary aryl amine.

15. 1,4 - diaminoanthraquinones corresponding to the general formula:

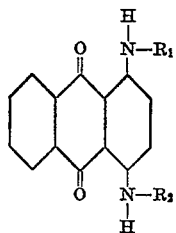

wherein R₁ stands for an aryl group and R₂ stands for a member of the group consisting of —OH, —NH₂, —NH-aryl, aryl groups different from R₁, aralkyl radicles containing more than 7 carbon atoms, heterocyclic radicles and radicles of aliphatic hydrocarbons containing at least two carbon atoms.

16. 1,4 - diaminoanthraquinones corresponding to the general formula:

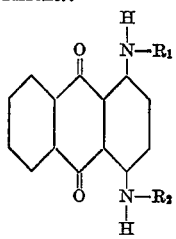

wherein R₁ stands for an aryl group and R₂ for the radicle of an aliphatic hydrocarbon containing at least two carbon atoms.

17. 1,4 - diaminoanthraquinones corresponding to the general formula:

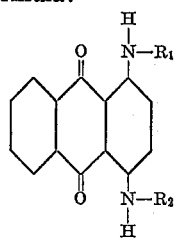

wherein R₁ stands for an aryl group and R₂ for a heterocyclic radicle.

18. 1,4 - diaminoanthraquinones corresponding to the general formula:

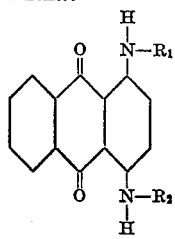

wherein R₁ stands for an aryl group and R₂ for an aralkyl radicle containing more than 7 carbon atoms.

19. The 1,4-diaminoanthraquinone corresponding to the formula:

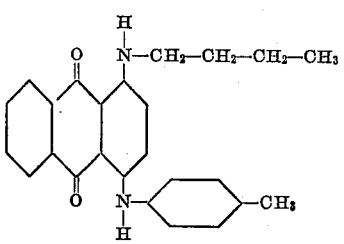

20. A process of producing N-substitution products of 1,4-diaminoanthraquinones which comprises condensing a leuco compound of a 1,4-diaminoanthraquinone with 2 to 2.5 molecular proportions of a mixture containing besides less than 2 molecular proportions of a primary arylamine a primary amine different from said primary arylamine.

KARL KOEBERLE.
ROBERT SCHWEIZER.
CHRISTIAN STEIGERWALD.